(12) United States Patent
Lee (10) Patent No.: US 12,309,306 B2
(45) Date of Patent: May 20, 2025

(54) ADJUSTING MECHANISMS FOR FLEXIBLE DISPLAY PANELS

(71) Applicant: Hewlett-Packard Development Company, L.P., Spring, TX (US)

(72) Inventor: Chien-Kuo Lee, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 177 days.

(21) Appl. No.: 17/919,149

(22) PCT Filed: Apr. 30, 2020

(86) PCT No.: PCT/US2020/030748
§ 371 (c)(1),
(2) Date: Oct. 14, 2022

(87) PCT Pub. No.: WO2021/221662
PCT Pub. Date: Nov. 4, 2021

(65) Prior Publication Data
US 2023/0119184 A1    Apr. 20, 2023

(51) Int. Cl.
*G06F 1/16*      (2006.01)
*H04M 1/02*    (2006.01)

(52) U.S. Cl.
CPC ........ *H04M 1/0268* (2013.01); *G06F 1/1616* (2013.01); *G06F 1/1652* (2013.01); *G06F 1/1681* (2013.01)

(58) Field of Classification Search
None
See application file for complete search history.

(56) References Cited

U.S. PATENT DOCUMENTS

| | | | |
|---|---|---|---|
| 10,212,830 B2 | 2/2019 | Wang | |
| 10,551,880 B1* | 2/2020 | Ai | G06F 1/1641 |
| 10,747,269 B1* | 8/2020 | Choi | G06F 1/1652 |
| 10,878,728 B2* | 12/2020 | Yoon | G06F 1/1624 |
| 11,240,923 B2* | 2/2022 | Wang | G06F 1/1616 |
| 11,416,036 B2* | 8/2022 | Yin | G06F 1/1652 |
| 11,775,030 B2* | 10/2023 | Huang | G06F 1/1681 |
| | | | 361/679.01 |
| 2007/0206349 A1 | 9/2007 | Jacobs | |

(Continued)

FOREIGN PATENT DOCUMENTS

| | | |
|---|---|---|
| CN | 101571731 A | 11/2009 |
| CN | 106205385 A | 12/2016 |

(Continued)

*Primary Examiner* — Anthony Q Edwards
*Assistant Examiner* — Rashen E Morrison
(74) *Attorney, Agent, or Firm* — Knobbe, Martens, Olson & Bear, LLP (57) ABSTRACT

Examples of a foldable device having a flexible display panel and an adjusting mechanism therefor is described herein. In one example, the foldable device can include an enclosure having a first segment and a second segment connected to each other by a hinge and the flexible display panel is housed inside the enclosure. The adjusting mechanism is operably coupled to the enclosure and the flexible display panel. The adjusting mechanism can adjust a curvature of the flexible display panel to about a permissible curvature upon relative motion between the first segment and the second segment of the enclosure.

11 Claims, 6 Drawing Sheets

(56) References Cited

U.S. PATENT DOCUMENTS

| | | | |
|---|---|---|---|
| 2013/0058063 A1* | 3/2013 | O'Brien | G06F 1/1624 |
| | | | 361/807 |
| 2013/0208436 A1 | 8/2013 | Hu | |
| 2018/0299709 A1 | 10/2018 | Lee | |
| 2019/0317552 A1* | 10/2019 | Cheng | G06F 1/166 |
| 2020/0117245 A1* | 4/2020 | Ou | H04M 1/0216 |
| 2020/0337159 A1* | 10/2020 | Yang | G06F 1/1652 |

FOREIGN PATENT DOCUMENTS

| | | |
|---|---|---|
| CN | 108648624 A | 10/2018 |
| CN | 111009190 A | 4/2020 |
| JP | 2002-344591 A | 11/2002 |
| TW | 522775 B | 3/2003 |
| WO | 2006/065645 A2 | 6/2006 |
| WO | 2017/051788 A1 | 3/2017 |

\* cited by examiner

ADJUSTING MECHANISMS FOR FLEXIBLE DISPLAY PANELS

BACKGROUND

Recent advancements in technology has led to devices, such as mobile phones, tablet personal computers (PCs), and laptop PCs, with foldable displays. In such devices, the display has a flexible display panel which can fold along with the device. When the device is in an operable mode, i.e., in an unfolded position, the flexible display panel forms a single, continuous screen of the device.

BRIEF DESCRIPTION OF FIGURES

The detailed description is provided with reference to the accompanying figures, wherein.

It should be noted that the description and the figures are merely examples of the present subject matter and are not meant to represent the subject matter itself. Throughout the drawings, identical reference numbers designate similar, but not identical, elements. The figures are not to scale, and the size of some parts may be exaggerated to more clearly illustrate the example shown. Moreover, the drawings provide examples and/or examples consistent with the description; however, the description is not limited to the examples and/or examples provided in the drawings.

DETAILED DESCRIPTION

Flexible display panels of foldable devices are, generally, designed to be foldable without operation of the display panel being affected. Accordingly, the devices are designed such that the flexible display panels do not form a crease at a folding line, for instance, an imaginary line along which the flexible display panels fold. In other words, the flexible display panels, and by extension, the devices, when folded, may have a considerable curvature at the folding line, leading to a substantial gap between the two folded portions of the device. As a result of the substantial gap, a size of the foldable device may be such that it is not ergonomic for handling as well as for stowing. In addition, the substantial gap may also adversely affect aesthetics of the foldable device.

Examples of foldable devices having flexible display panels and adjusting mechanisms therefor are described herein. According to an aspect, the foldable devices are designed to have a substantially small gap between two folded segments thereof. At the same time, the functionality of the flexible display panel remains unhindered and unaffected For instance, a permissible curvature of the flexible display panel is maintained which may be greater than the gap between the two folded segments of the flexible device.

In one example, the foldable device includes an enclosure which is foldable and includes a flexible display panel housed inside the enclosure. The enclosure has a first segment and a second segment connected to each other by a hinge. The flexible display panel is foldable along with the enclosure and includes a folding portion in proximity of the hinge. Further, the foldable device includes an adjusting mechanism operably coupled to the enclosure and the flexible display panel. The adjusting mechanism can adjust a curvature of the folding portion to about a permissible curvature upon relative motion between the first segment and the second segment of the enclosure, for instance, when the first segment and the second segment are brought together to bring the device in a non-operable mode or a folded condition. According to said example, the adjusting mechanism may be positioned in proximity of the hinge and, upon relative movement between the first segment and the second segment from an operable or unfolded position to the non-operable state, the adjusting mechanism can retract the folding portion from the enclosure to adjust the curvature of the folding portion.

Therefore, with such a design of the foldable devices, the foldable device can have a substantially small gap between the first and the second segments when folded. At the same time, the adjusting mechanism maintains the adequate curvature of the flexible display panel in order to prevent any malfunction in the operation of the flexible display panel. As explained above, the adjusting mechanism can maintain the curvature of the folding portion of the flexible panel display to about the permissible curvature. In one example, the permissible curvature for the flexible display panel may be about twice of a gap between the first segment and the second segment in a non-operable state. For instance, in the non-operable state, the first segment and the second segment may have a gap of about 3 millimeter (mm) therebetween, and, at the folding portion, the gap between the flexible display panel on either side of the folding portion can be about 6 millimeter (mm).

The above aspects are further described in conjunction with the figures, and in associated description below. It should be noted that the description and figures merely illustrate principles of the present subject matter. Therefore, various arrangements that encompass the principles of the present subject matter, although not explicitly described or shown herein, may be devised from the description and are included within its scope. Additionally, the word "coupled" is used throughout for clarity of the description and can include either a direct connection or an indirect connection.

Figure 1:
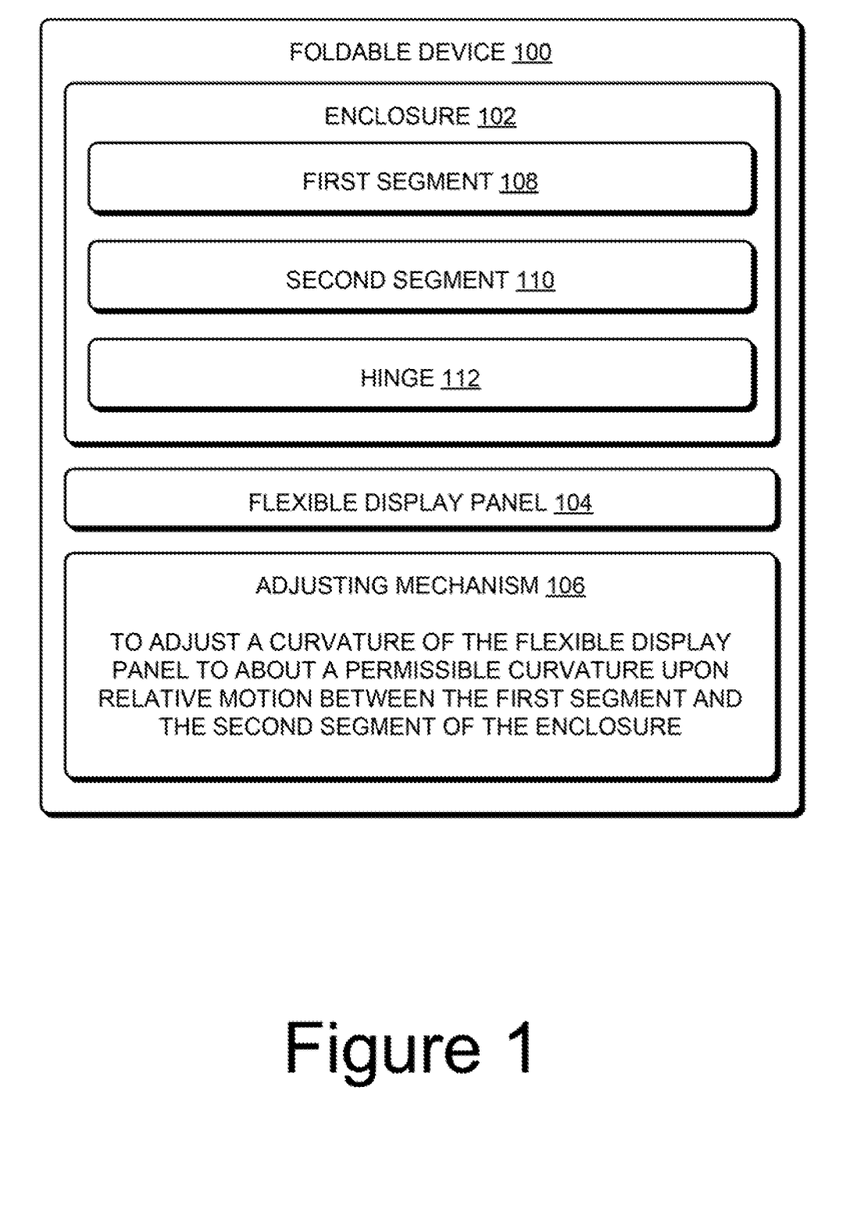
FIG. 1 illustrates a schematic of a foldable device having an adjusting mechanism for a flexible display panel, according to an example.

FIG. 1 illustrates a schematic of a foldable device 100, in accordance with an example of the present subject matter. The foldable device 100 may be a computing device, such as a mobile phone, a tablet personal computer (PC), a personal digital assistant (PDA), or a PC having a clamshell form, for instance, as that of a laptop PC. In one case where the foldable device 100 is a mobile phone, it, may be a flip phone with a continuous foldable screen. In another case where the foldable device 100 has a clamshell form, it may be a notebook PC, a 2-in-1 convertible-type device, or a clamshell-type device having a 360 degrees screen-rotation. In all such devices, as mentioned previously, a single, continuous, foldable screen may be provided.

According to the present example, the foldable device 100 can include an enclosure 102, a flexible display panel 104 housed in the enclosure 102, and an adjusting mechanism 106 operably coupled to the enclosure 102 and the flexible display panel 104. The enclosure 102 may be have a first segment 108 and a second segment 110 connected to each other by a hinge 112. According to an aspect, the adjusting mechanism 106 can adjust a curvature of the flexible display panel 104 to about a permissible curvature upon relative motion between the first segment 108 and the second segment 110 of the enclosure 102. For example, in case of a notebook PC or the flip phone, the two parts of the device can be the first segment 108 and the second segment 110. In said example, the flexible display panel 104 may be provided on an entire surface of the first segment 108 and of the second segment 110, or partially on either one of them, or partially on both.

In other words, depending on whether the foldable device 100 is being brought into an operable state or a non-operable state by moving the first segment 108 with respect to the second segment 110, the adjusting mechanism 106 can, accordingly, adjust the curvature of the flexible display panel 104. For instance, when the foldable device 100 is brought in a non-operable state in which the first segment 108 and the second segment 110 may be brought together to close the foldable device 100, the adjusting mechanism 106 can adjust the curvature of the flexible display panel 104 such that, even though a gap between the first segment 108 and the second segment 110 is less than the permissible curvature of the flexible display panel 104, the curvature of the flexible display panel 104 is not less than the permissible curvature.

As an example, the permissible curvature of the flexible display panel 104 may be a curvature beyond which if the flexible display panel 104 is bent, it may create a crease on the flexible display panel 104. In another example, if the flexible display panel 104 is bent beyond the permissible curvature, it may lead to an adverse effect on the operability of the flexible display panel 104.

Figure 2:
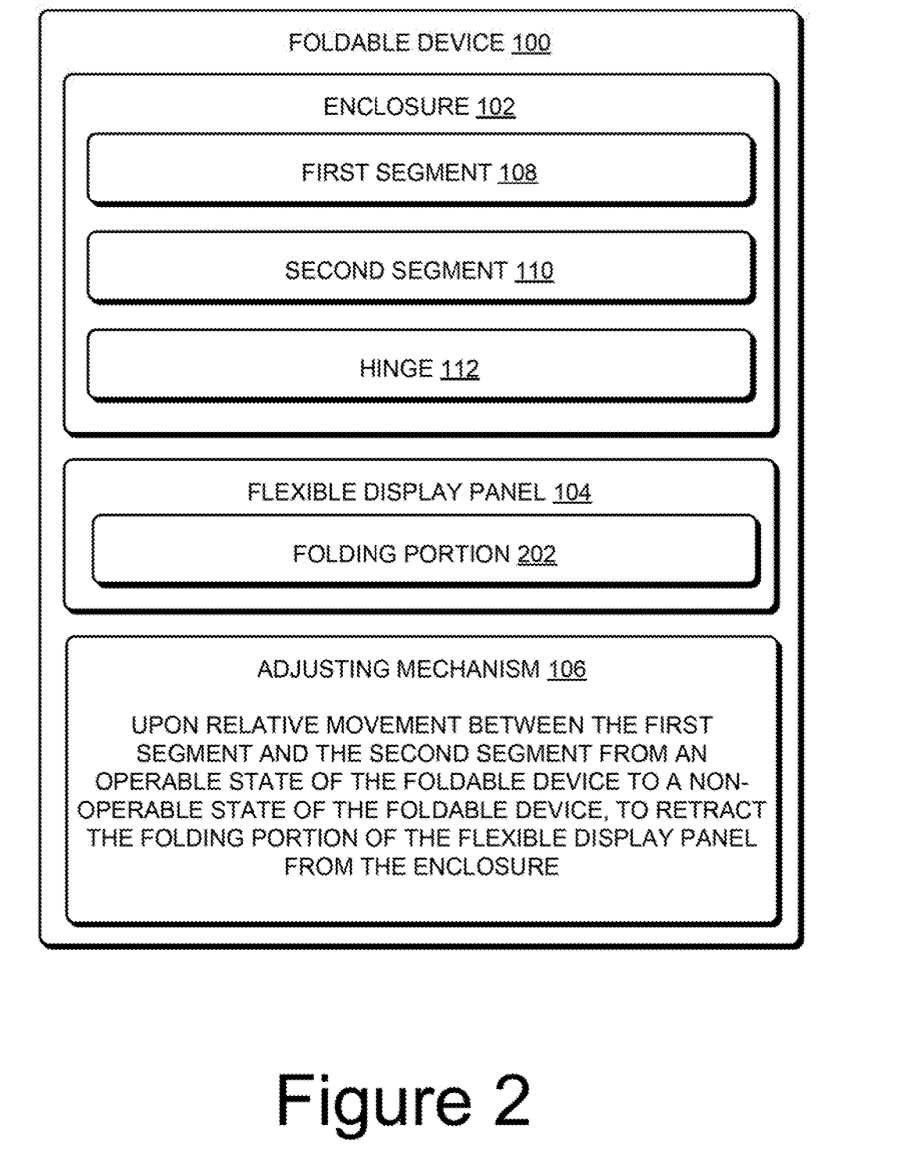
FIG. 2 illustrates a schematic of the foldable device, according to another example.

FIG. 2 illustrates a schematic of the foldable device 100 in accordance with another example of the present subject matter. In the present example, in addition to that described in reference to FIG. 1, the flexible display panel 104 can include a folding portion 202 in proximity of the hinge 112, the flexible display panel 104 being foldable along with the enclosure at the folding portion 202. The adjusting mechanism 106 is positioned in proximity of the hinge 112 and, as explained earlier, is operably coupled to the enclosure 102 and the flexible display panel 104. In the present example, upon relative movement between the first segment 108 and the second segment 110 from an operable state of the foldable device 100 to a non-operable state of the foldable device 100, the adjusting mechanism 106 is to retract the folding portion 202 of the flexible display panel 104 from the enclosure 102. In other words, when the first segment 108 is moved relative to the second segment 110 to bring the foldable device 100 from the operable state to the non-operable state, the adjusting mechanism 106 can retract the folding portion 202, for instance, to adjust the curvature of the folding portion 202, in the manner explained previously with reference to FIG. 1.

As an example, the operable state of the foldable device 100 can be any state in which the foldable device 100 is operational. For instance, in case the foldable device 100 is a notebook PC or a flip phone, the operable state can be when the display of the foldable device 100 is unfolded and the foldable device 100 is operational, which can be dependent on a design and type of the foldable device 100. Accordingly, in the operable state, the first segment 108 may have multiple positions in which it can be positioned relative to the second segment 110. In one example, in the operable state, the first segment 108 may be substantially perpendicular to the second segment 110. In another example, the first segment 108 may be at about 180 degrees with respect to the second segment 110 to form a substantially flat screen of the foldable device 100, in the operable state of the foldable device. On the other hand, the non-operable state of the foldable device 100 can be a state in which the foldable device 100 is folded or closed and the first segment 108 and the second segment 110 can abut against each other at an edge which is distal from the hinge 112. In one case, for example, in which the foldable device 100 is a notebook PC or a 2-in-1 device, the non-operable state may be a state in which the foldable device 100 is not operational, for instance, either in a sleep mode or switched off. In other examples, the non-operable state may refer to a state in which the device is not being used in an open manner. The device may still be running, processing data, and/or executing instructions etc., even if the device is folded or closed. In another case, for example, where the foldable device 100 is a foldable mobile phone or a flip phone, the non-operable mode may be a mode in which the foldable device is folded but is still powered on, for instance, operable via a secondary display. In such a state, the foldable device 100 can be designed to have a gap between the first segment 108 and the second segment 110, for example, at the hinge 112. In said example, when the foldable device 100 is folded, the first segment 108 and the second segment 110 may be slanted with respect to each other, such that the edges of the two segments 108 and 110 distal to the hinge 112 may abut against each other, while at the hinge 112, the gap may exist. For instance, the gap at the hinge 112 may be about half the permissible curvature of the flexible display panel 104 being used.

Figure 3:
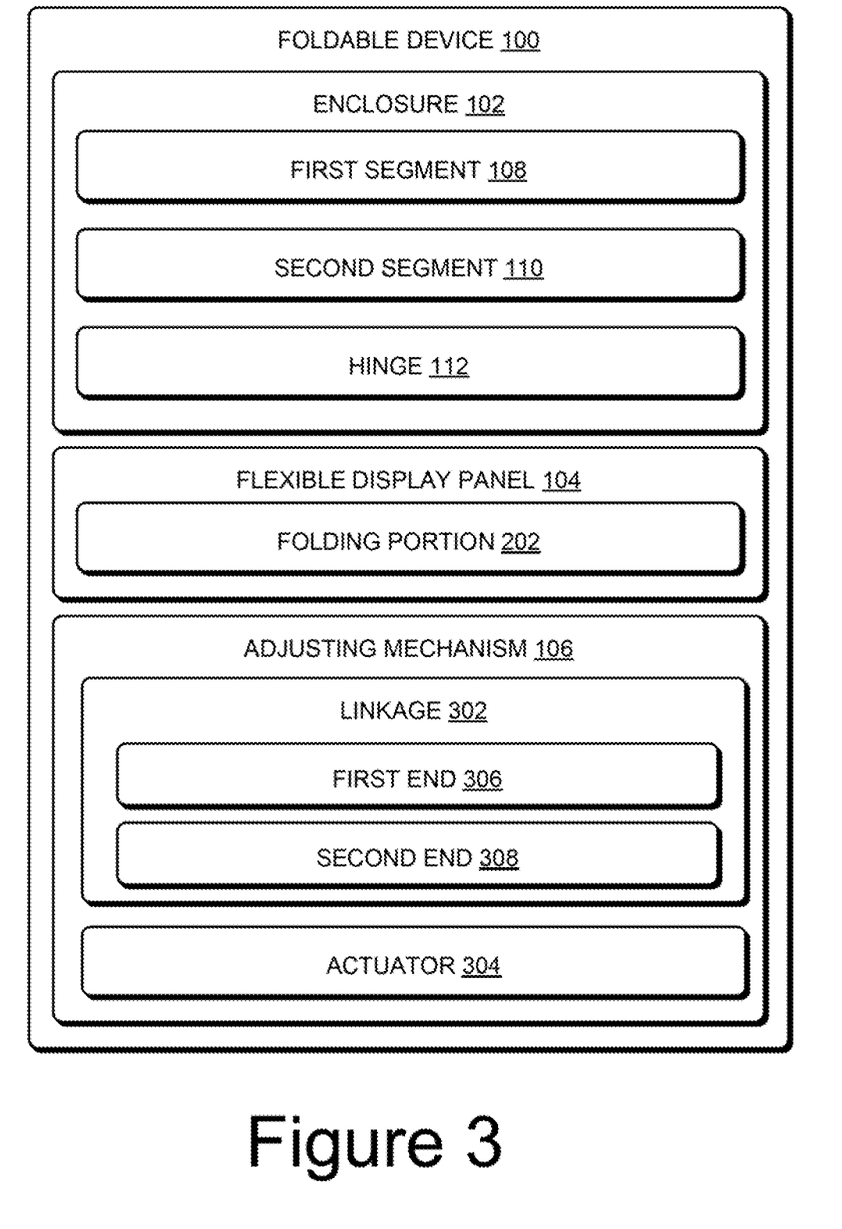
FIG. 3 illustrates a schematic of the foldable device, in accordance with yet another example.

FIG. 3 illustrates a schematic of the foldable device 100, according to yet another example of the present subject matter. In the present example, in addition to that described with reference to FIG. 1 and FIG. 2, the adjusting mechanism 106, positioned in proximity of the hinge 112 and operably coupled to the enclosure 102 and the flexible display panel 104, can include a linkage 302 and an actuator 304 to adjust the curvature of the flexible display panel 104.

The linkage 302 can have a first end 306 and a second end 308, the first end 306 coupled to the folding portion 202 of the flexible display panel 104. The actuator 304 can be coupled to the second end 308 of the linkage 302. In addition, the actuator 304 can be movably coupled to the enclosure 102, such that the movement of the enclosure 102 can move the actuator 304 which can, in turn, cause the movement of the linkage 302 by virtue of its coupling thereto. Accordingly, upon relative movement between the first segment 108 and the second segment 110 from the operable state to the non-operable state, the actuator 304 can move the linkage 302, which can in turn, move the flexible display panel 104, for instance, in the proximity of the hinge 112, to adjust the curvature of the folding portion 202 by retracting the folding portion 202 from the enclosure.

Similarly, upon the relative motion between the first segment 108 and the second segment 110 from the non-operable state to the operable state of the foldable device 100, the actuator is to move the linkage such that the folding portion 202 of the flexible display panel 104 can abut against the enclosure 102. In such a position, for instance, the flexible display panel 104 can adequately function as a screen of the foldable device 100 such that the view or the display is not distorted for a user viewing the foldable device 100.

Further, the adjusting mechanism 106 is so designed that the actuator 304 can retain the flexible display panel 104 abutted against the enclosure 102 in various positions of the first segment 108 relative to the second segment 110 in the operable state of the foldable device 100. Therefore, the adjusting mechanism 106 ensures that as long as the foldable device 100 is in the operable state, irrespective of the relative positions of the first segment 108 and the second segment 110, the operation of the flexible display panel 104 as the screen of the foldable device 100 is not adversely affected. The foldable device 100 is described in further detail with reference to FIG. 4A to FIG. 6B.

Figure 4A:
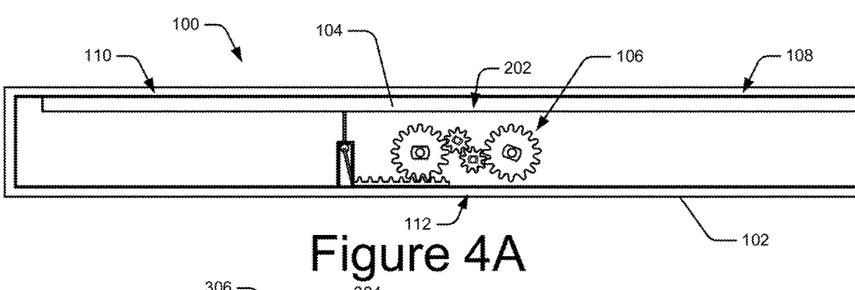
FIG. 4A and FIG. 4B illustrate various views of the foldable device in a first position in an operable state, according to an example.
Figure 4B:
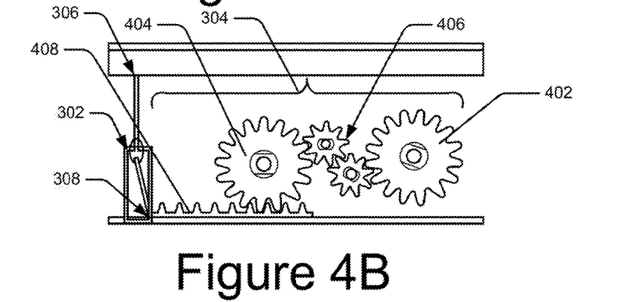

FIG. 4A and FIG. 4B illustrate the foldable device 100 in a first position in the operable state of the foldable device 100, according to an example of the present subject matter. FIGS. 4A and 4B, both, illustrate a sectional view of the foldable device 100 showing various components thereof. FIG. 48 shows a magnified view at the hinge 112 of the foldable device 100, according to said example. For the sake of brevity and ease of understanding. FIG. 4A and FIG. 4B, are discussed in conjunction hereinafter.

As described above, the adjusting mechanism 106 is so designed that the flexible display panel 104 is to be retained abutted against the enclosure 102 in the operable state of the foldable device 100, in various positions of the first segment 108 relative to the second segment 110. In the example illustrated in FIGS. 4A and 4B, the first position can be an open position of the foldable device 100, such as a mobile phone or a foldable tablet PC, in which position the flexible display panel 104 of the foldable device 100 can form a single, continuous screen without a bend or fold therein.

The adjusting mechanism 106 includes the linkage 302 and the actuator 304. The first end 306 of the linkage 302 can be coupled to the flexible display panel 104, for instance, at the folding portion 202, whereas the second end 308 of the linkage 302 can be coupled to the actuator 304. In turn, the actuator 304 can be operably coupled to the enclosure 102 in a way that a movement of the enclosure 102, for instance, for opening the enclosure 102 to bring the foldable device 100 in the operable state or closing the enclosure 102 to bring it in the non-operable state, can cause the actuator 304 to move. The coupling between the actuator 304 and the linkage 302, upon movement of the actuator 304, can cause the linkage 302 to move which can, in turn, control and adjust the curvature of the flexible display panel 104, for instance, at the folding portion 202.

Further, as shown in FIG. 4A and FIG. 4B, in the first position, such as the open position, of the first segment 108 and the second segment 110 in the operable state of the foldable device 100, the linkage 302 is in such a position that the flexible display panel 104 remains abutted against the enclosure 102. For instance, the linkage 302 can be a rigid linkage which can maintain the flexible display panel 104 either abutted against the enclosure 102 or withdraw it away from the enclosure 102, as will be explained in detail later.

In an example, the actuator 304 includes a first wheel 402 rotatably coupled to the first segment 108 of the enclosure 102, to be rotatable upon movement of the first segment 108 in relation to the second segment 110, for opening or closing the enclosure 102. Further, the actuator 304 can include a second wheel 404 rotatably coupled to the second segment 110 of the enclosure 102, which can be rotated upon the rotation of the first wheel 402 upon movement of the enclosure 102. Accordingly, the actuator 304 can include a drive transfer mechanism 406 to couple the first wheel 402 to the second wheel 404 to transfer motion of the first wheel 402 to the second wheel 404. In one example, as shown in FIGS. 4A and 48, the drive transfer mechanism 406 can include a set of intermediary idle gears to transfer the motion from the first wheel 402 to the second wheel 404. In other examples, other mechanisms such as a chain drive or a belt drive may be employed.

Further, the actuator 304 can include a rack mechanism 408 operably coupled to the second wheel 404 and also coupled to the second end 308 of the linkage 302. The rack mechanism 408 can convert the rotational motion of the second wheel 404, caused by the movement of the enclosure 102 which rotates the first wheel 402, into a translational motion which can cause actuation of the linkage 302. In other words, the rotation of the second wheel 404 can cause the movement of the rack mechanism 408 to move the linkage 302, for instance, for retracting the folding portion 202 of the flexible display panel 104. However, in certain cases, the movement of the rack mechanism 408 may not retract the folding portion 202, as will be discussed in detail later.

In an example, an axis of rotation of the first wheel 402 can be fixedly mounted to the first segment 108 such that the relative movement of the first segment 108 can cause rotation of the first wheel 402 but does not change the position of the axis of the rotation of the first wheel 402. Further, in another example or in the same example as above, an axis of rotation of the second wheel 404 can be fixedly mounted to the second segment 110 such that the movement of the first segment 108 can rotate the first wheel 402 which can cause rotation of the second wheel 404 but does not change the position of the axis of the rotation of the second wheel 404. Accordingly, upon relative movement between the first segment 108 and the second segment 110, the distance between the first wheel 402 and the second wheel 404 may change, and the drive transfer mechanism 406 can be designed to accommodate the change in distance and still be able to transfer motion from the first wheel 402 to the second wheel 404.

Figure 5A:
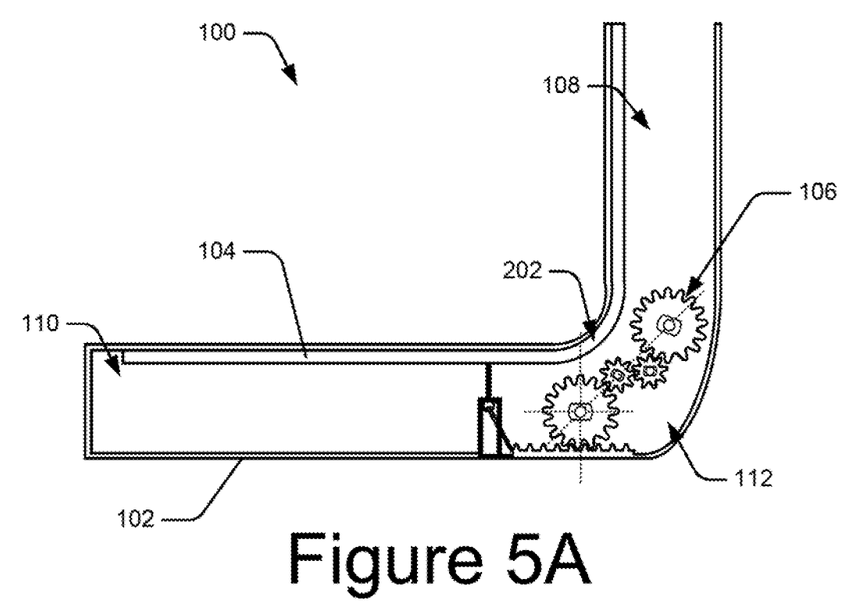
FIG. 5A and FIG. 5B illustrate various views of the foldable device in a second position in the operable state, according to an example.
Figure 5B:
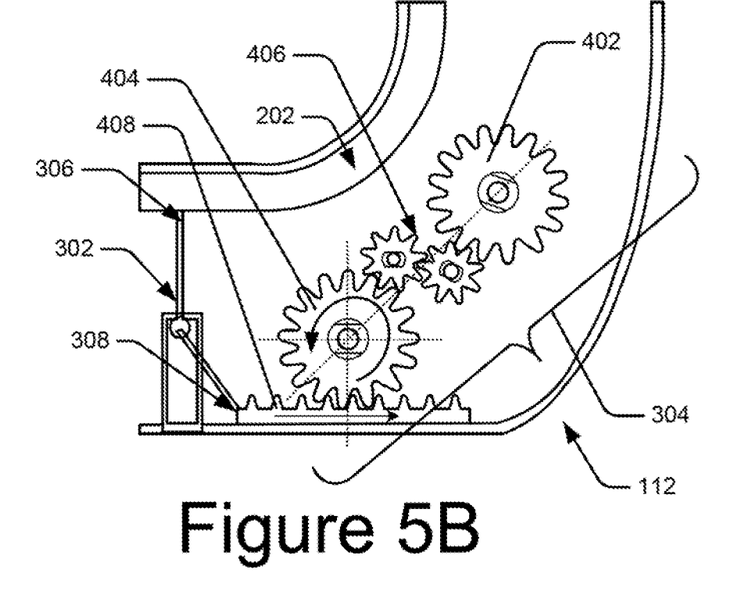

FIG. 5A and FIG. 5B illustrate the foldable device 100 in a second position, such as an intermediate position, in the operable state of the foldable device 100, according to an example of the present subject matter. FIGS. 5A and 5B, both, illustrate a sectional view of the foldable device 100 showing various components thereof FIG. 58 shows a magnified view at the hinge 112 of the foldable device 100, according to said example. For the sake of brevity and ease of understanding, FIG. 5A and FIG. 5B, are discussed in conjunction hereinafter.

As an example, when the foldable device 100 is in the second position or the intermediate position shown in FIGS. 5A and 56, the first segment 108 may be substantially perpendicular to the second segment, for instance, when the foldable device 100 is a notebook PC. In such a position, the flexible display panel 104, for example, the folding portion 202 thereof, remains abutted against the enclosure 102. Therefore, as mentioned above, during movement of the first segment 108 with respect to the second segment 110 in any relative position in the operable state, the flexible display panel 104 is retained to be abutted against the enclosure 102. In other words, despite any movement of the first segment 108 with respect to the second segment 110, the flexible display panel 104 is not retracted from the enclosure 102, as long as the foldable device 100 is in the operable state. As soon as the movement of the first segment 108 is such that it changes the state of the foldable device 100 from operable to non-operable, the adjusting mechanism 106 can retract the flexible display panel 104 away from the enclosure 102 to adjust the curvature of the folding portion 202. This is explained in further detail with respect to FIGS. 6A and 6B.

Coming back to FIGS. 5A and 5B, the linkage 302 of the actuator 304 is designed to retain the flexible display panel 104 abutted against the enclosure 102, for instance, the folding portion 202 abutted at the hinge 112, during movement of the first segment 108 in various positions in the operable state. Accordingly, the linkage 302 can be designed such that the linkage 302 is actuated by the movement of the rack mechanism 408 upon motion of the first segment 108 relative to the second segment 110, still the linkage 302 does not cause the movement of the folding portion 202 flexible display panel 104 with respect to the enclosure 102. In other words, the linkage 302 is flexible to move along with the rack mechanism 408 in the operable state of the foldable device 100, without causing any movement of the flexible display panel 104 with respect to the enclosure 102.

Accordingly, in one example, the linkage 302 can include a plurality of arms (not shown) telescopically coupled to each other through an elastic member, such as a spring. In other words, the elastic member may connect the telescopic arms of the linkage 302 in such manner that a relative motion between the arms is achieved against a bias force of the elastic member. For instance, such a design can provide the linkage 302 with the flexibility that one arm coupled to the folding portion 202 remains stationary while the other arm coupled to the rack mechanism 408 can exhibit motion relative to the stationary arm, and hence, relative to the flexible display panel 104. When the movement of the rack mechanism 408 is beyond a predetermined position, for instance, due to the movement of the first segment 108 to bring the foldable device 100 into the non-operable state, relative motion between the arms can be arrested. For instance, the spring can be designed such that the spring, upon such a motion of the rack mechanism 408 when the foldable device 100 goes into the non-operable state, starts acting as a rigid member connecting the two arms together.

Accordingly, when the linkage 302 is actuated by the actuator 304 during movement of the first segment 108 with respect to the second segment 110 in various positions in the operable state of the foldable device, the arms of the linkage 302 can exhibit relative motion therebetween to retain the folding portion 202 of the flexible display panel 104 abutted against the enclosure 102. When the movement of the first segment 108 with respect to the second segment 110 is such that the state of the foldable device 100 changes from operable to non-operable, the arms can move as a single unit to retract the folding portion 202 from the enclosure 102, to adjust the curvature of the folding portion 202.

Figure 6A:
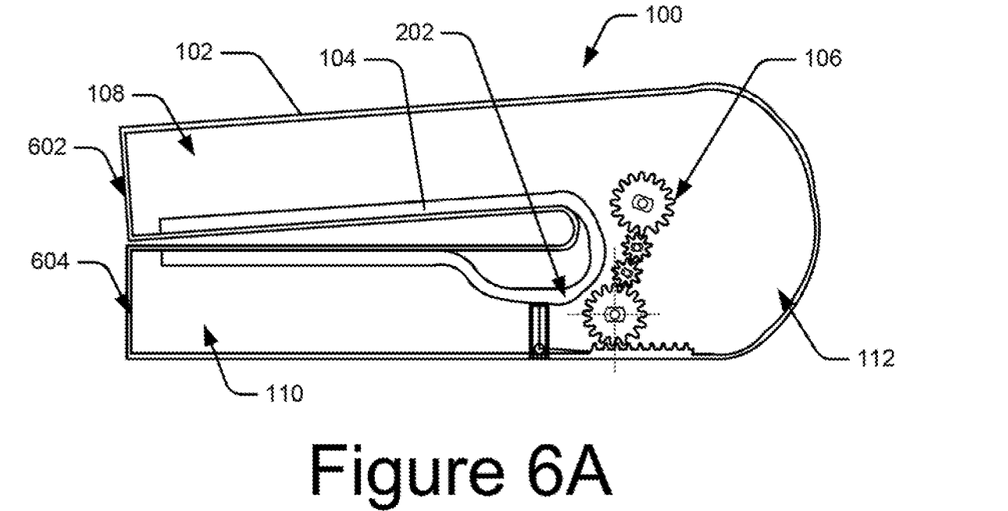
FIG. 6A and FIG. 6B illustrate various views of the foldable device in a non-operable state, according to an example.
Figure 6B:
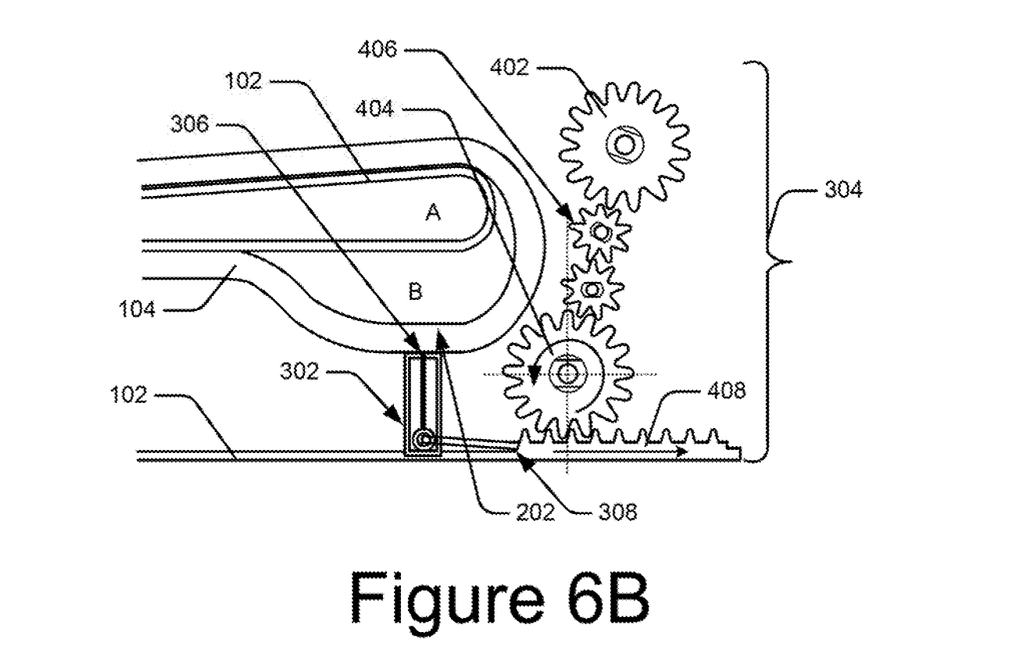

FIG. 6A and FIG. 6B illustrate the foldable device 100 in the non-operable state of the foldable device 100, according to an example of the present subject matter. FIGS. 6A and 6B, both, illustrate a sectional view of the foldable device 100 showing various components thereof. FIG. 6B shows a magnified view at the hinge 112 of the foldable device 100, according to said example. For the sake of brevity and ease of understanding, FIG. 6A and FIG. 6B, are discussed in conjunction hereinafter.

As explained earlier, the non-operable state of the foldable device 100 can be a state in which the foldable device is folded and is either powered off or is still powered on, for instance, operable for checking the time, weather, or any alert messages. In one example, in the non-operable state, the foldable device 100 can be folded for being closed and the first segment 108 and the second segment 110 can abut against each other at edges 602 and 604 which are distal from the hinge 112. In said example, when the foldable device 100 is folded, the first segment 108 and the second segment 110 may be slanted with respect to each other, such that a space between the two segments 108 and 110 may increase from the edges 602 and 604 to the hinge 112 culminating in the gap at the hinge 112. In other words, in such a state, the foldable device 100 can be designed to have a gap between the first segment 108 and the second segment 110 at the hinge 112, and the gap may be about half the permissible curvature of the flexible display panel 104 being used.

When the movement of the first segment 108 relative to the second segment 110 brings the foldable device 100 in the non-operable state, as shown in FIGS. 6A and 6B, the adjusting mechanism 106 is triggered into action to adjust the curvature of the flexible display panel 104, for instance, at the folding portion 202. As an example, the foldable device 100 may be designed in a manner that a gap A between the facing surfaces of the first segment 108 and the second segment 110 in the non-operable state is less than the permissible curvature of the flexible display panel 104 being used. For instance, when the two segments 108 and 110 abut against each other at their edges 602 and 604 which are distal from the hinge 112, to close the foldable device 100, the gap near the hinge 112 between the two segments 108 and 110 may be about 3 millimeters (mm).

Therefore, when the movement of the first segment 108 changes the state of the foldable device 100 from operable to non-operable, the adjusting mechanism 106 can retract the flexible display panel 104 away from the enclosure 102 to adjust the curvature of the folding portion 202. The movement of the first wheel 402 caused by the movement of the first segment 108 can cause the movement of the second wheel 404, thereby causing the rack mechanism 408 to translate or move in a direction away from the linkage 302. Such a motion of the rack mechanism 408 can cause the linkage 302 to move, as a single unit, away from the folding portion 202, pulling the folding portion 202 therewith to adjust the curvature of the folding portion 202. The linkage 302 may cause the folding portion 202 to retract away from the enclosure 102 by a predetermined distance B, which is sufficient for making the curvature A+B of the folding portion 202 equal to or greater than the permissible curvature. In continuation with the above example, the linkage 302 may retract the folding portion 202 by about 3 millimeters (mm) such that the curvature or gap between the flexible display panel 104 on either side of the folding portion is about 6 millimeters (mm). In such a case, the permissible curvature of the flexible display panel 104 may be 6 mm or lesser.

Although aspects of the adjusting mechanism 106 for the flexible display panel 104 have been described in a language specific to structural features and/or methods, it is to be understood that the subject matter is not limited to the features or methods described. Rather, the features and methods are disclosed as examples of adjusting mechanism 106 for the flexible display panel 104.

I claim:
1. A foldable device comprising:
an enclosure having a first segment and a second segment connected to each other by a hinge;
a flexible display panel housed inside the enclosure, wherein the flexible display panel comprises a folding portion in proximity of the hinge; and
an adjusting mechanism operably coupled to the enclosure and the flexible display panel, the adjusting mechanism comprising:
a linkage having a first end and a second end, the first end coupled to the flexible display panel;

an actuator coupled to the second end of the linkage, wherein the actuator is movably coupled to the enclosure;

a first wheel rotatably coupled to the first segment of the enclosure to be rotatable upon movement of the first segment in relation to the second segment;

a second wheel rotatably coupled to the second segment of the enclosure;

a drive transfer mechanism to couple the first wheel to the second wheel to transfer motion of the first wheel to the second wheel; and a rack mechanism operably coupled to the second wheel and coupled to the second end of the linkage, wherein a rotation of the second wheel is to move the rack mechanism to move the linkage to retract the flexible display panel from the enclosure;

wherein the actuator is to move the linkage upon relative motion between the first segment and the second segment of the enclosure from an operable state of the foldable device to a non-operable state of the foldable device, and wherein movement of the linkage is to retract the flexible display panel from the enclosure; and wherein, upon the relative motion between the first segment and the second segment of the enclosure, the adjusting mechanism is to adjust a curvature of the flexible display panel to about a permissible curvature and the adjusting mechanism is to retract the folding portion away from the enclosure to form a space between the enclosure and the folding portion.

2. The foldable device as claimed in claim 1, wherein the actuator is to move the linkage upon the relative motion between the first segment and the second segment of the enclosure from the non-operable state to the operable state, and wherein the movement of the linkage is to move the flexible display panel to abut against the enclosure.

3. The foldable device as claimed in claim 1, wherein the actuator is to retain the flexible display panel abutted against the enclosure during movement of the first segment in various positions in the operable state.

4. The foldable device as claimed in claim 1, wherein the permissible curvature is about twice of a gap between the first segment and the second segment at the hinge in a non-operable state.

5. A foldable device comprising:
an enclosure having a first segment and a second segment connected to each other by a hinge;

a flexible display panel housed inside the enclosure, wherein the flexible display panel comprises a folding portion in proximity of the hinge and foldable along with the enclosure; and an adjusting mechanism positioned in proximity of the hinge and operably coupled to the enclosure and the flexible display panel, the adjusting mechanism comprising:

a linkage having a first end and a second end, the first end coupled to the folding portion of the flexible display panel;

an actuator coupled to the second end of the linkage, wherein the actuator is movably coupled to the enclosure to move the linkage, wherein movement of the linkage is to retract the folding portion;

a plurality of arms telescopically coupled to each other; and an elastic member connecting the plurality of arms, wherein a relative motion between the plurality of arms is achieved against a bias force of the elastic member;

wherein the plurality of arms is to exhibit relative motion therebetween upon being actuated by the actuator during relative movement of the first segment with respect to the second segment in various positions in an operable state to retain the folding portion abutted against the enclosure;

wherein the plurality of arms is to move as a single unit upon movement of the first segment with respect to the second segment from the operable state to a non-operable state to retract the folding portion from the enclosure; and wherein, upon relative movement between the first segment and the second segment from the operable state of the foldable device to the non-operable state of the foldable device, the adjusting mechanism is to retract the folding portion of the flexible display panel from the enclosure to form a space between the enclosure and the folding portion.

6. The foldable device as claimed in claim 5, wherein the actuator is to move the linkage upon the relative movement between the first segment and the second segment of the enclosure from the non-operable state to the operable state, and wherein movement of the linkage is to move the folding portion of the flexible display panel to abut against the enclosure.

7. The foldable device as claimed in claim 5, wherein the actuator is to retain the flexible display panel abutted against the enclosure during movement of the first segment in various positions in the operable state.

8. The foldable device as claimed in claim 5, wherein the actuator comprises:

a first wheel rotatably coupled to the first segment of the enclosure to be rotatable upon movement of the first segment in relation to the second segment;

a second wheel rotatably coupled to the second segment of the enclosure;

a drive transfer mechanism to couple the first wheel to the second wheel to transfer motion of the first wheel to the second wheel; and a rack mechanism operably coupled to the second wheel and coupled to the first end of the linkage, wherein a rotation of the second wheel is to move the rack mechanism to move the linkage to retract the folding portion.

9. The foldable device as claimed in claim 5, wherein the adjusting mechanism is to retract the folding portion to adjust a curvature of the folding portion to about a permissible curvature, the permissible curvature being about twice of a gap between the first segment and the second segment at the hinge in a non-operable state of the foldable device.

10. A foldable device comprising:
an enclosure having a first segment and a second segment connected to each other by a hinge;

a flexible display panel housed inside the enclosure, wherein the flexible display panel comprises a folding portion in proximity of the hinge and foldable along with the enclosure; and an adjusting mechanism positioned in proximity of the hinge and operably coupled to the enclosure and the flexible display panel, the adjusting mechanism comprising:

a linkage having a first end and a second end, the first end coupled to the folding portion of the flexible display panel;

an actuator coupled to the second end of the linkage, wherein the actuator is movably coupled to the enclosure to move the linkage, wherein movement of the linkage is to retract the flexible display panel from the enclosure;

a first wheel rotatably coupled to the first segment of the enclosure to be rotatable upon movement of the first segment in relation to the second segment;

a second wheel rotatably coupled to the second segment of the enclosure;

a drive transfer mechanism to couple the first wheel to the second wheel to transfer motion of the first wheel to the second wheel; and a rack mechanism operably coupled to the second wheel and coupled to the second end of the linkage, wherein a rotation of the second wheel is to move the rack mechanism to move the linkage to retract the flexible display panel from the enclosure;

wherein, upon relative movement between the first segment and the second segment from an operable state of the foldable device to a non-operable state of the foldable device, the actuator is to move the linkage to adjust a curvature of the folding portion by retracting the folding portion away from the enclosure such that a space is formed between the enclosure and the folding portion.

11. The foldable device as claimed in claim 10, wherein the actuator is to adjust the curvature of the folding portion to about a permissible curvature, the permissible curvature being about twice of a gap between the first segment and the second segment at the hinge in a non-operable state of the foldable device.

* * * * *